G. J. GENEBACH.
HAND RAKE.
APPLICATION FILED JULY 22, 1912.
1,066,400.
Patented July 1, 1913.
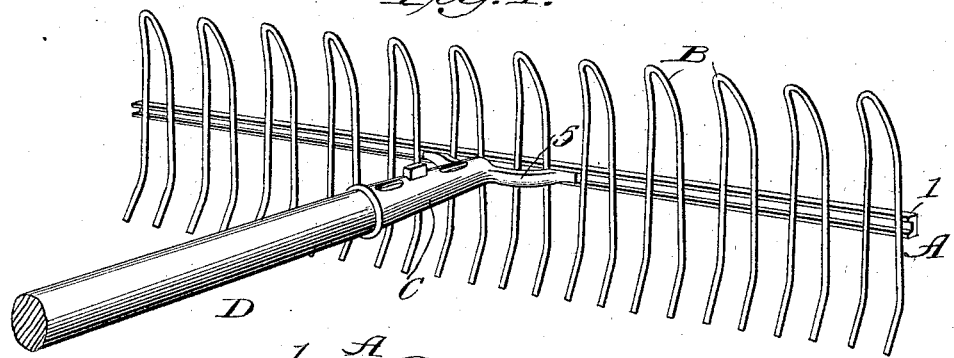
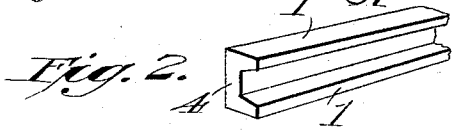
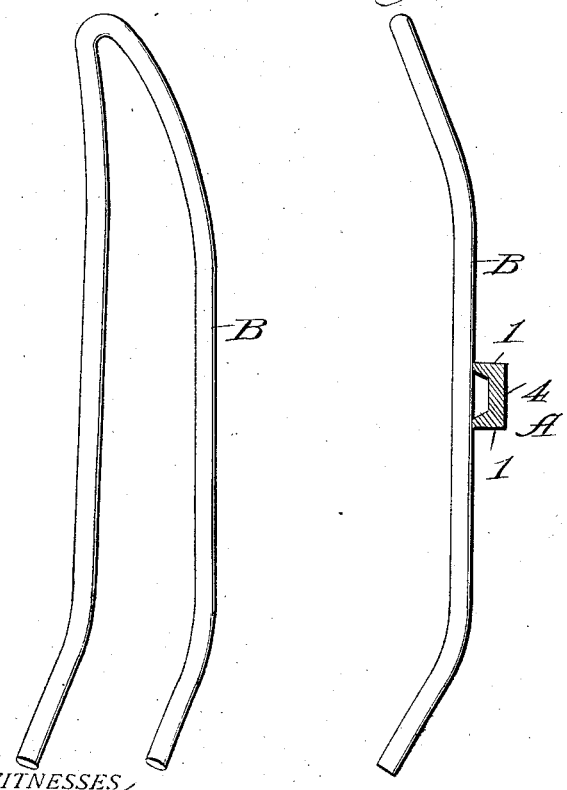
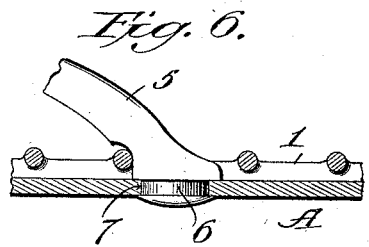
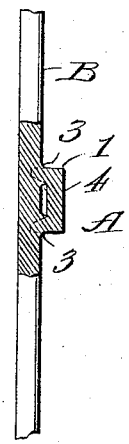
WITNESSES
INVENTOR
George J. Genebach
By Rexford M. Smith
Attorney

UNITED STATES PATENT OFFICE.

GEORGE J. GENEBACH, OF BATTLE CREEK, MICHIGAN, ASSIGNOR TO UNITED STEEL AND WIRE COMPANY, OF BATTLE CREEK, MICHIGAN, A CORPORATION.

HAND-RAKE.

1,066,400.      Specification of Letters Patent.      Patented July 1, 1913.

Application filed July 22, 1912. Serial No. 710,805.

*To all whom it may concern:*

Be it known that I, GEORGE J. GENEBACH, a citizen of the United States, residing at Battle Creek, in the county of Calhoun and State of Michigan, have invented certain new and useful Improvements in Hand-Rakes, of which the following is a specification, reference being had therein to the accompanying drawing.

This invention relates to hand rakes and particularly to rake heads of that type in which the back or base thereof is made of channel iron or the like and to which teeth formed of wire are fastened. According to former constructions, the flanges or ribs of the channel bar are perforated to receive the wire teeth and various methods are resorted to for fastening the teeth in place. Such rake heads are expensive and difficult to make and otherwise unsatisfactory.

The objects of the present invention are to provide a rake head which is considerably cheaper, stronger, and lighter than other rakes of the kind referred to and more easily and quickly made. These results are attained by electrically welding the teeth to the channel iron back or base. The perforating of the flanges or ribs of the back or base is dispensed with and the teeth are placed on or in electrical contact with the edges of the flanges or ribs and the contacting parts heated by the passage of a current. When at the proper heat pressure is applied so as to weld the teeth to the back. In this manner, the teeth are easily and quickly attached and the point of union is by actual tests found to be double the strength of the wire of which the teeth are made.

For a more specific understanding of the invention, reference is to be made to the accompanying drawing and to the following description and claim.

In the drawing, which illustrates one embodiment of the invention, Figure 1 is a perspective view of the rake head. Fig. 2 is a fragmentary view of the back or base. Fig. 3 is a view of one of the teeth. Fig. 4 is a view showing the back and a tooth before welded together. Fig. 5 is a similar view after welding of the parts. Fig. 6 is a longitudinal section of the base or back showing the handle socket fastened thereto.

Similar reference characters are employed to designate corresponding parts throughout the views.

Referring to the drawing, A designates the base or back which is a bar of channel iron or other form, embodying a plurality of flanges or ribs 1, to which the teeth B of well-known form are fastened. The teeth are shown as constructed from wire stock and bent U-shaped. These teeth extend transversely to the base or back A and have their middle portions fastened to the ribs or flanges 1, the head being of the double-tooth type. It is to be understood, however, that the present invention covers single toothed rake heads.

In fastening the teeth to the base, any suitable electric welding machine may be employed. The teeth and base are clamped together between electrodes, the teeth being in contact with and extending across the edges of the flanges 1 of the base, as shown in Fig. 4. Current passing through the contacting parts produces the required heat, when pressure is subjected on the base and teeth for effecting the weld 3, as shown in Fig. 5. The wire of the teeth becomes about half way embedded in the flanges 1 and the metal of the latter flows outwardly, uniting with the tooth so that an extended area of the tooth is welded to the back. No attempt is made to unite the teeth to the portion 4 of the base, as union with the ribs or flanges 1 is sufficient, as thereby each tooth has a plurality of points of connection with the base.

A socket C may be provided for the handle D. The socket is forked to provide diverging arms 5 which are shaped at their extremities to enter and fit between the flanges 1 and these extremities are reduced as shown at 6, Fig. 6, to enter openings 7 in the base, the reduced extremities being then upset or riveted against the back of the bar A, thus rigidly securing the socket to the base.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim as new, is:—

A hand rake embodying a head consisting of a channel bar having upper and lower imperforate flanges extending longitudinally thereof, teeth in the form of U-shaped wire members spaced apart on the bar and welded to said flanges, and a handle socket formed with divergent fork arms which straddle the central teeth, the extremities of said arms fitting between said flanges and being reduced and inserted through the bar and riveted against the back of the bar.

In testimony whereof I affix my signature in presence of two witnesses.

GEORGE J. GENEBACH.

Witnesses:
 D. E. FITTON,
 S. P. CLAY.

Copies of this patent may be obtained for five cents each, by addressing the "Commissioner of Patents, Washington, D. C."